Figure 1:
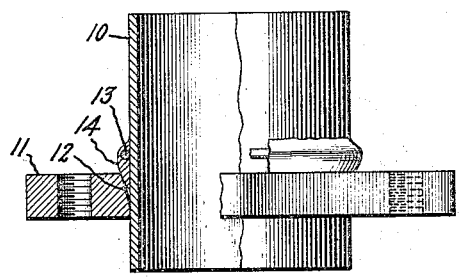

May 9, 1939.   W. K. RANKIN   2,157,918
ART OF UNITING METALS
Filed Feb. 18, 1937

Inventor:
William K. Rankin
by Harry E. Dunham
His Attorney.

Patented May 9, 1939

2,157,918

UNITED STATES PATENT OFFICE 2,157,918

ART OF UNITING METALS

William K. Rankin, Lansdowne, Pa., assignor to General Electric Company, a corporation of New York Application February 18, 1937, Serial No. 126,380

10 Claims. (Cl. 113—112)

This invention relates broadly to the art of uniting metals and more particularly to various improvements and modifications in the fabrication of structures comprising two like or different metals united by means of a bonding medium such as solder. The invention is especially concerned with an improved method of uniting certain shaped bodies composed or having a surface of copper or of copper alloys, for example brass or bronze, by means of a solder or alloy composed mainly of, or containing a substantial amount of silver.

In broad terms it may be said that the invention provides an article of manufacture comprising at least two metallic members positioned substantially at right angles to each other and rigidly united with solder. The preferred solder is characterized by having at soldering temperature a fluidity and adhesiveness such that it is able to wet and flow downwardly over that metallic member which in the soldering operation is perpendicularly positioned with respect to an adjoining horizontal metallic member to be soldered thereto; and also by having a surface tension and cohesiveness in liquid state at soldering temperature sufficient to prevent movement of the undisturbed solder in a horizontal plane any substantial distance over the upper surface of said horizontal member and outwardly from the joint between said members.

An example of a structure fabricated in accordance with this invention comprises a flange or a collar of metallic copper or copper alloy which is soldered to a tube or other cylindrical member composed either of copper or copper alloy or of iron or iron alloy. A more specific example of a structure of this kind is a bushing comprising a brass collar soldered with a silver-containing alloy to a brass tube. Such bushings find use in the construction of certain types of electrical apparatus such, for instance, as an oil-circuit breaker.

It has been known heretofore that metal bodies made, for instance, of copper or of copper alloys may be united by means of alloys or solders comprising a substantial amount of silver. In the trade such solders are commonly designated as "silver solders". Brazing or silver soldering of non-ferrous parts heretofore commonly has been a hand operation, the success of which depended largely upon the skill of the operator. Each part required separate treatment. The operation necessitated skilled labor and the finished joint showed variations in mechanical strength and appearance. Further, the joint had surface irregularities common to such methods. Hence the fabricated article not only lacked being neat-looking, but the soldering operation itself was comparatively expensive by reason of the high labor cost per unit soldered.

One object of this invention is to provide articles of manufacture comprising metal members, particularly members either composed essentially of, or containing, or having surfaces of metal of the kind hereinbefore mentioned by way of illustration, which members are neatly rigidly and strongly joined or bonded together.

Another object of the invention is to provide a method whereby a plurality of articles comprising members to be firmly united may be rigidly attached to each other in a single heating operation and at the same time, which method is independent of the skill of the individual operator and provides articles having joints characterized by their uniformity in mechanical strength and neat appearance.

Figure 2:
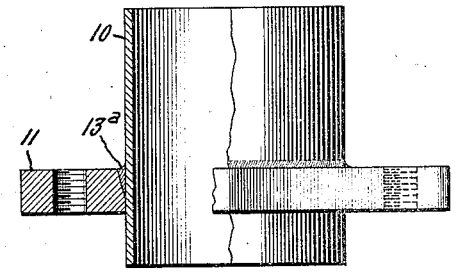
Figure 3:
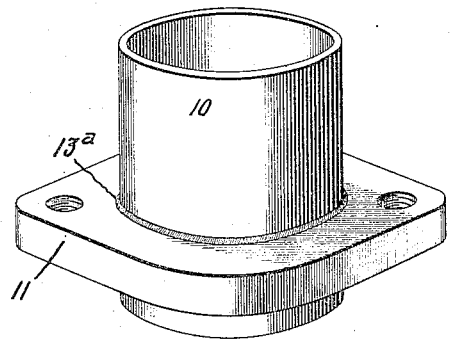

The novel features which are characteristic of my invention are set forth in the appended claims. The invention itself, however, will best be understood by reference to the following specification when considered in connection with the accompanying drawing, which is representative of one embodiment of the invention, and in which Fig. 1 is illustrative of a step in the method of uniting articles in accordance with this invention and shows, partly in longitudinal section and partly in elevation, the initial assembly of the essential parts of a bushing with a collar thereon;

Fig. 2 is similar to Fig. 1, but shows the solid metal parts soldered together; and Fig. 3 is a perspective view of the article shown in section in Fig. 2.

Referring to the drawing, 10 is a metal tube made, for instance, of copper or of copper-containing metal such as brass or bronze, upon which is positioned metal collar 11 at the point of desired permanent union. Collar 11 may be made, for example, of ferrous metal such as steel or of non-ferrous metal such as copper or copper-containing material. Between the tube 10 and the collar 11 is a recess or pocket 12 (Fig. 1) which is formed in a manner that hereinafter will be more fully described. For purpose of illustration the size of this recess has been exaggerated. 13 and 13a represent bonding metal or solder, which is shown at 13 in Fig. 1 as being in wire form and placed circumferentially upon tube 10 at a point above recess 12, and at 13a in Fig. 2 as filling completely recess 12 and bonding together members 10 and 11. 14 (Fig. 1) is a flux which covers solder ring 13 and recess 12. In the drawing (Fig. 1) this recess is shown as being not only covered with flux but also as being partly filled with the same.

The following description of the fabrication of an article, such as a bushing of the kind shown in the drawing and comprising a collar made for example of brass united to a tube composed for instance also of brass, is illustrative of how this invention may be carried into effect:

From a sheet of brass, for example ¼ inch thick, is punched a collar of the desired size and shape, and with a central opening of a diameter approximately that of the outside diameter of the brass tube to which it is to be united. In practicing this embodiment of my invention advantage is taken of the fact that a hole formed in metal by a punching operation will be straight only for a part of the thickness of the metal, after which the hole gradually will increase in diameter until it reaches the diameter of the hole in the die. This taper is controllable and may be varied as the clearance between the punch and the die is varied. A collar which it is desired to join or fixedly attach to a tube or other cylindrical object is therefore, in accordance with this invention, so punched from sheet metal such as brass that it will fit snugly the tube or cylinder, made for example also of brass, for about one-fourth to one-third its thickness. The punching step is so controlled, however, that for the remaining thickness the diameter of the hole appreciably increases. As a result of such a punching operation, a cavity or pocket adapted for the entrance of solder is formed when the collar is placed in proper position upon the tube.

In assembling tube 10 and collar 11 the collar is placed upon the tube with the side of the collar, facing upwards, which has an opening of maximum diameter on that side. Solder wire is formed as a helix having an inside diameter approximately that of the outside diameter of the brass tube. The helix is cut so that each turn will form a complete ring that will fit snugly around the tube. The ring or band of solder wire is then placed around the outer circumference of the tube so that when subjected to a soldering temperature it will melt, flow downwardly to and in, and fill circular recess 12, which is formed in the manner hereinbefore described. Advantageously this ring of solder wire is placed about the tube in the manner shown in Fig. 1, that is, at a level substantially above the nearest surface of collar 11, for example, about one-eighth to one-fourth inch thereabove. Such practice increases the strength of the joint and the neatness of the work, and reduces the number of failures, as it was found that when the ring of solder wire was dropped over the tube so that it rested on the flange, the molten solder frequently would not bridge the 0.003 to 0.005 inch gap between the flange and the tube. The liquid solder simply spread unevenly over the surface of the work.

The recess 12 and solder wire 13 is then covered with solder flux 14 in any convenient manner. The preferred flux has the consistency of thick paint and is applied to the solder wire and joint by means of a brush. The application of the flux to the joint prevents premature oxidation of the facing surfaces to be soldered together. The flux dries and hardens quickly enough to hold the ring of solder wire in position despite any jars occasioned by handling.

In order to carry this invention into effect it is necessary to use a solder which meets certain definite requirements. The solder must have such properties that it not only will flow freely at the selected soldering temperature, which temperature must be so high as to deform or otherwise to affect detrimentally the physical properties of the assembled metal members, but also it must have such adhesiveness in liquid state at the soldering temperature that it will effectively wet those metal surfaces with which it necessarily comes in contact, for example, the walls of recess 12. The preferred solder is one which is sufficiently fluid at soldering temperature that it will penetrate and completely and uniformly fill recess 12, will effectively wet the surfaces of such recess or pocket, and has such a high surface tension in liquid state that any small surcess of solver over that required evenly to fill such recess will not flow or spread appreciably over a horizontally positioned metal member such, for example, as collar 11. In other words when the preferred solder is employed, the sum of the forces acting to prevent spreading of the excess solder in liquid state over the aforementioned metal member is greater, by reason of properties particular and peculiar to such solder, than the sum of the forces tending to cause spreading of such solder over said metal member. Consequently, the excess solder does not move any substantial distance outwardly from the solder joint and a smooth, uniform and neat-looking fillet is formed at the joint between the metallic members. The results are surprising and unobvious, for it could not be foreseen that a solder having sufficient fluidity and adhesiveness at soldering temperature effectively to wet facing metal surfaces to be united also could have at the same temperature sufficient surface tension and cohesiveness to resist flow in a horizontal plane over a metal surface; nor was it obvious that a solder having such properties could be used in a manner as herein set forth to produce a smooth, neat-appearing and mechanically strong joint.

In uniting in accordance with this invention, for example, a collar of brass, bronze or steel to a tube or cylinder composed of like or similar ferrous or non-ferrous metals, a solder having the properties hereinbefore described at a soldering temperature of about 700° C. contains, for instance, silver, copper, zinc and cadmium. A solder which has been found especially advantageous for use in fixedly attaching a brass collar to a brass tube by the method employed in practicing this invention consists essentially, by weight, of about 50 per cent silver, about 15.5 per cent copper, about 16.5 per cent zinc and about 18 per cent cadmium. Such a solder has a melting point of about 635° C., and a fluidity, adhesiveness, surface tension and cohesiveness at a temperature of about 700° C. such as to effect the results herein described. The cadmium content of such a solder may be varied somewhat. For instance, instead of about 18 per cent cadmium, the cadmium content may be between about 15 and 30 per cent, and the percentages of the other solder ingredients, viz., silver, copper and zinc be varied so as to produce a solder having a melting point of the order of about 635° C. Although the melting point of a solder is somewhat of an indication of its fluidity at a given soldering temperature, it is mainly the proper selection and proportioning of the ingredients which determines whether or not its fluidity and adhesiveness, or its fluidity, adhesiveness, surface tension and cohesiveness at soldering temperature are such as to make it suitable for use in practicing this invention.

When the appearance of the finished work is a matter of secondary consideration, other so-called "low-melting silver solders" may be used, for example, a solder containing about 80 per cent copper, about 15 per cent silver and about 5 per cent phosphorus. Such a solder has a melting point of about 640° C. and results in a joint which is satisfactory from the standpoint of mechanical strength. Although the melting point of such a solder is conducive to its suitability for use, it has a tendency to spread over the surface of the work in a horizontal plane and outwardly from the solder joint by reason of the comparatively low surface tension and cohesive properties of the liquid solder at soldering temperature. The finished work is therefore not of neat appearance; that is, it is covered with solder at points other than in the immediate region of the joint.

Although various fluxes may be used, the flux 14 (Fig. 1) preferably should have a melting point approximately the same as that of the solder employed. For example, when using a silver solder having a melting point of about 635° C., a flux having about the same melting point is preferred. A flux having, for example, a melting point ranging between about 620° C. and about 650° C. may be used satisfactorily in connection with a silver solder having a melting point of about 635° C.

I have found that a particularly suitable flux is one which comprises alkali acid fluoride. As illustrative thereof I mention a flux containing from about 25 to about 60 per cent of acid alkali fluoride and about 75 to about 40 per cent of alkali borate such as alkali tetraborate; and, also, a flux consisting mainly of an acid alkali fluoride such as acid potassium fluoride but containing also appreciable quantities of boric acid and an alkali carbonate such as potassium carbonate, the quantity of boric acid in the flux being at least equal to the quantity of alkali carbonate. Such fluxes are described, for example, in Phelan Patents 1,717,250 and 1,835,965, which are assigned to the same assignee as the present invention. A flux comprising acid alkali fluoride, borax, and boric acid also may be used.

The parts assembled as shown in Fig. 1 are placed in a furnace, with the assembly in such position that the solder band is above the horizontal member, and therein subjected to a heat treatment sufficient to melt the solder and flux and to effect flow of the solder to and at the point of union between the metallic members. The temperature and period of heat treatment is insufficient to deform or otherwise affect detrimentally the physical properties of the metallic parts.

In the silver soldering of copper alloys such as brass the members advantageously are soldered together at a temperature of about 695° to 705° C., the furnace atmosphere and other conditions being closely controlled so as to obtain such temperature. The temperature and time of heating are very important. Common alloys of copper usually have a melting point between about 800° and 1050° C., but parts made of such materials may start to deform by their own weight before the melting temperature has been reached. Careful and accurate temperature control is therefore necessary in practicing this invention in order that the parts may be neatly and rigidly joined together without injuring the metal members. Although an essentially non-oxidizing atmosphere, that is, an inert or reducing atmosphere, is preferred, the silver soldering of copper alloy members may be effected, if desired, in an atmosphere which is slightly oxidizing. In such cases the flux prevents premature oxidation of the facing surfaces which are to be soldered together.

A convenient method of soldering the assembled parts in a batch-type electrically heated furnace in accordance with this invention is as follows:

The furnace atmosphere is brought to a temperature of about 760° C. The assembled parts are placed in an open metal pan together with carbon blocks arranged to support the assembly and to provide an inert or reducing atmosphere at the joint. The pan with the parts thereon is put into the preheated furnace. The time the assembled parts should be maintained in the furnace to produce the desired result will vary with the size of the charge and other influencing factors. The required period may be determined empirically. I have found that about 15 minutes' time in the heating zone of an electric furnace is a suitable period for soldering 22 units of assembled brass members weighing a total of 6 pounds, placed in a pan as above-described and when the furnace atmosphere initially has been preheated to a temperature of about 760° C. A charge of such size is thus brought to, and maintained at a temperature of about 700° C. long enough to melt the solder and flux, and to join the parts with a layer of solder. At the soldering temperature the flux melts and fills circular recess 12. The solder melts and flows down the sides of the tube mainly by gravity, wetting the metal in its downward flow. When the liquid solder reaches recess 12 it displaces the molten flux. When the preferred solder is employed, its high surface tension and cohesiveness in liquid state at soldering temperature serve to prevent spread of any excess solder any substantial distance over collar 11.

It is important that the work does not remain in the furnace too long after the solder flows, since a prolonged heating period or an excess temperature gives the solidified solder a rough appearance due to the bubbling or boiling of the liquid solder. An excess heat treatment also gives the alloy itself a scaly appearance, unless an inert or reducing atmosphere be maintained during the soldering operation.

At the end of the heating period the pan containing the soldered articles is removed from the furnace. The solder solidifies on cooling. Surplus flux is removed, for example, by immersion of the soldered article in boiling water. When the temperature and time of heating have been properly balanced, surfaces are restored to their original brightness by a bright acid dip subsequent to the boiling water treatment.

It will be understood, of course, that the method is not limited to the batch heat treatment of a plurality of assembled members to be soldered in a furnace in a manner such as hereinbefore set forth, but that such members may be brought to the required temperature in a furnace to which the assembly is charged semi-continuously or continuously in accordance with well-known methods.

For certain work, for instance in soldering together members composed of the copper, silicon, manganese alloy known under the trade-name of "Everdur", it is advantageous to place the work in a metal box provided with a loosely fitting lid and to place a considerable amount of carbon block in the box with the work.

In all cases the use of carbon blocks adjacent the work is unnecessary when the furnace atmosphere is made reducing by passing hydrogen or a reducing combusted gas mixture into the furnace.

Obviously, this invention is not limited to the soldering of a metallic collar about a metallic tube or a solid metallic cylinder, and for purpose of illustration it is mentioned that any other form of metallic flange may be united in accordance with this invention substantially at right angles to a metallic pipe, bar or other shaped member which is maintained in a vertical position during the soldering operation. Similarly, a metallic base may be soldered to a pipe or bar, advantageously by first reaming or punching such base so that when the members are assembled in position for soldering a recess or cavity adapted for the entrance of solder will be provided at the point of union of such members.

Articles produced by uniting metallic members in accordance with this invention are surprisingly strong at the point of union, being much stronger at this point than articles made, for example, by casting a collar around a tube. Mechanical tests made on brass bushings, provided with brass collars as hereinbefore described, have shown that the solder joint is stronger than the brass itself. In attempting to force the brass tube from the brass collar, the tube itself was torn or crushed before these was any indication of failure in the joint. When the preferred solder is employed, the joint is smooth and uniform in its external appearance, and is practically free from wave-like or other surface irregularities visible to the naked eye and which are characteristic of joints made by the use of ordinary welding or soldering methods and materials; further, surfaces of the article adjacent the joint are not made unsightly by the presence of excess solder, so that the finished work is of unusually neat appearance.

By practicing the present invention a plurality of articles may be soldered at the same time, with obvious savings in cost as compared with the manual soldering of individual pieces of work. The personal element in soldering is obviated, and with non-skilled labor better and more uniform work is obtained than heretofore has been possible.

What I claim as new and desire to secure by Letters Patent of the United States is:

1. An article of manufacture comprising a straight-surfaced metallic member adapted to be maintained in a vertical position, a relatively thick metallic collar encircling said member and closely fitting substantially at right angles thereto, the facing surfaces of said member and collar comprising copper, said collar having a slightly tapered passageway therethrough, said passageway having uncurved side walls and a diameter approximately that of the outside diameter of said metallic member but with a diameter of opening on the upper side appreciably in excess of the diameter of opening on the opposite side thereby forming a recess between said collar and said metallic member, and a mass of solder filling said recess and rigidly uniting said collar to said metallic member, said solder consisting, by weight, of about 15 to 30 per cent cadmium and the remainder silver, copper and zinc so proportioned that the solder has a melting point of the order of about 635° C.

2. An article of manufacture comprising a straight-surfaced metallic member adapted to be maintained in a vertical position, a relatively thick metallic collar encircling said member and closely fitting substantially at right angles thereto, the facing surfaces of said member and collar comprising copper, said collar having a slightly tapered passageway therethrough, said passageway having uncurved sidewalls and a diameter approximately that of the outside diameter of said metallic member but with a diameter of opening on the upper side appreciably in excess of the diameter of opening on the opposite side thereby forming a recess between said collar and said metallic member, and a mass of solder filling said recess and rigidly uniting said collar to said metallic member, said solder comprising copper, silver and phosphorus so proportioned that the solder has a melting point of the order of about 640° C.

3. An article of manufacture comprising a cylindrical member having a surface of copper alloy, a relatively thick collar having a surface of copper alloy encircling said cylindrical member and closely fitting substantially at right angles thereto, said collar having a slightly tapered passageway therethrough, said passageway having uncurved side walls and a diameter approximately that of the outside diameter of said cylindrical member but with a diameter of opening on the upper side appreciably in excess of the diameter of opening on the opposite side thereby forming a circular cavity between said collar and said cylindrical member, and a mass of solder filling said cavity and rigidly uniting said collar and said cylindrical member, said solder consisting, by weight, of about 15 to 30 per cent cadmium and the remainder silver, copper and zinc so proportioned that the solder has a melting point of the order of about 635° C.

4. An article as in claim 3 wherein the solder consists, by weight, of about 50 per cent silver, about 15.5 per cent copper, about 16.5 per cent zinc and about 18 per cent cadmium.

5. In an article of manufacture, in combination, a brass tube, a relatively thick brass collar encircling said tube and closely fitting substantially at right angles thereto, said collar having a slightly tapered passageway therethrough, said passageway having uncurved side walls and a diameter approximately that of the outside diameter of said tube but with a diameter of opening on the upper side appreciably in excess of the diameter of opening on the opposite side thereby forming a circular cavity between said collar and said tube, and a mass of solder filling said cavity and rigidly uniting said collar to said tube, said solder consisting, by weight, of about 15 to 30 per cent cadmium and the remainder silver, copper and zinc so proportioned that the solder has a melting point of the order of about 635° C.

6. In an article of manufacture, in combination, a brass tube, a relatively thick brass collar encircling said tube and closely fitting substantially at right angles thereto, said collar having a slightly tapered passageway therethrough, said passageway having uncurved sidewalls and a diameter approximately that of the outside diameter of said tube but with a diameter of opening on the upper side appreciably in excess of the diameter of opening on the opposite side thereby forming a circular cavity between said collar and said tube, and a mass of solder filling said cavity and rigidly uniting said collar to said tube, said solder consisting, by weight, of about 80 per cent copper, about 15 per cent silver and about 5 per cent phosphorus.

7. In electrical apparatus, in combination, a brass tube, a relatively thick brass collar about said tube at substantially right angles thereto, said collar having a slightly tapered passageway therethrough, said passageway having uncurved side walls and a diameter approximately that of the outside diameter of said tube but with a diameter of opening on the upper side appreciably in excess of the diameter of opening on the opposite side thereby forming a circular cavity between said collar and said tube, and a mass of solder filling said cavity, said solder consisting, by weight, of about 50 per cent silver, about 15.5 per cent copper, about 16.5 per cent zinc and about 18 per cent cadmium, the joint thus formed between said collar and said tube being mechanically strong, smooth and uniform in its external appearance and practically free from surface irregularities visible to the naked eye.

8. A method of fabricating an article comprising a relatively thick horizontal metallic member rigidly united to a vertical cylindrical metallic member, said members having facing surfaces composed of a metal of the group consisting of copper and its alloys and being positioned substantially at right angles to each other, which method comprises punching a sheet of metal adapted to form said horizontal member in such manner that said sheet is provided with a slightly tapered passageway therethrough, said passageway having uncurved side walls and a diameter approximately that of the outside diameter of said vertical member but with a diameter of opening on one side appreciably in excess of the diameter of opening on the other side; placing said punched sheet forming said horizontal member upon said vertical member in such manner that during a subsequent soldering operation that side of the sheet faces upward which has an opening of maximum diameter on that side, thereby forming a recess adapted for the entrance of solder at the joint formed therebetween; placing a ring of solder about said vertical member at a point above the joint formed by said members and at a level substantially thereabove, said solder comprising as essential ingredients copper and silver and being modified so that its melting point is of the order of about 635° to 640° C.; applying a flux comprising an acid alkali fluoride to said ring of solder; heat treating the assembly in such position that the solder ring is above said horizontal member at a temperature and for a period of time sufficient to melt said solder and flux and to effect flow of the solder to and at the point of union of said metallic members but insufficient to affect detrimentally the physical properties of said members; and cooling the assembly to solidify said solder.

9. In providing a cylindrical member having a surface of copper alloy with a flange having a surface of copper alloy, said flange being rigidly united with said cylindrical member at an angle of about 90° therewith by means of a solder joint which is mechanically strong, smooth and uniform in its external appearance and practically free from surface irregularities visible to the naked eye, the method which comprises punching a sheet of metal adapted to form said flange in such manner that said sheet is provided with a slightly tapered passageway therethrough, said passageway having uncurved side walls and a diameter approximately that of the outside diameter of said cylindrical member but with a diameter of opening on one side appreciably in excess of the diameter of opening on the other side; placing said punched sheet forming said flange upon said cylindrical member in such manner that during a subsequent soldering operation that side of the sheet faces upward which has an opening of maximum diameter on that side, thereby forming a recess adapted for the entrance of solder at the joint formed therebetween; snugly fitting a ring of solder in wire form about said cylindrical member at a point above the joint formed by said flange and said cylindrical member and at a level substantially thereabove, said solder consisting, by weight, of about 15 to 30 per cent cadmium and the remainder silver, copper and zinc so proportioned that the solder has a melting point of the order of about 635° C.; applying a flux comprising an acid alkali fluoride to said ring of solder; heat treating the assembly, in such position that the solder ring is above said flange, at a temperature and for a period of time sufficient to melt said solder and flux and to effect flow of the solder to and at the point of union of said flange and said cylindrical member but insufficient to affect detrimentally the physical properties of the assembled metal members; and cooling the assembly to solidify said solder.

10. The method of fabricating a bushing comprising a brass collar rigidly united substantially at right angles to a brass tube by means of a solder joint which is mechanically strong, smooth and uniform in its external appearance and practically free from surface irregularities visible to the naked eye, which method comprises punching from a sheet of brass a collar of the desired size and shape in such manner that said collar is provided with a slightly tapered passageway therethrough, said passageway having uncurved side walls and a diameter approximately that of the outside diameter of the brass tube to which it is to be united but with a diameter of opening on one side appreciably in excess of the diameter of opening on the other side; placing said collar upon said tube in such manner that when said tube is in vertical position during a subsequent soldering operation that side of the collar faces upward which has an opening of maximum diameter on that side thereby forming a circular recess adapted for the entrance of solder at the joint formed by said collar and said tube; snugly fitting a ring of solder in wire form about the outer circumference of said tube at a level substantially above the joint formed by said collar and said tube, said solder consisting essentially, by weight, of about 50 per cent silver, about 15.5 per cent copper, about 16.5 per cent zinc and about 18 per cent cadmium; applying a flux comprising an acid alkali fluoride to said ring of solder and to the joint to cover said recess; heat treating the assembly at a temperature of about 700° C. to melt said solder and flux and to effect flow of the solder to and in said recess; cooling the assembly to form a solid joint of solder; and removing excess flux from the soldered article.

WILLIAM K. RANKIN.

CERTIFICATE OF CORRECTION.

Patent No. 2,157,918. May 9, 1939.

WILLIAM K. RANKIN.

It is hereby certified that error appears in the printed specification of the above numbered patent requiring correction as follows: Page 2, second column, line 6, after the word "must" insert not; lines 18 and 19, for "surcess of solver" read excess of solder; page 4, first column, line 37, for "these" read there; and that the said Letters Patent should be read with this correction therein that the same may conform to the record of the case in the Patent Office.

Signed and sealed this 13th day of June, A. D. 1939.

(Seal)

Henry Van Arsdale
Acting Commissioner of Patents.